US010749942B2

(12) United States Patent
Nakaaki et al.

(10) Patent No.: US 10,749,942 B2
(45) Date of Patent: Aug. 18, 2020

(54) INFORMATION PROCESSING SYSTEM AND METHOD

(71) Applicant: HITACHI, LTD., Tokyo (JP)

(72) Inventors: Yasuhiro Nakaaki, Tokyo (JP); Yuta Nakano, Tokyo (JP)

(73) Assignee: HITACHI, LTD., Tokyo (JP)

(*) Notice: Subject to any disclaimer, the term of this patent is extended or adjusted under 35 U.S.C. 154(b) by 134 days.

(21) Appl. No.: 16/085,418

(22) PCT Filed: Dec. 28, 2016

(86) PCT No.: PCT/JP2016/089184
§ 371 (c)(1),
(2) Date: Sep. 14, 2018

(87) PCT Pub. No.: WO2018/123051
PCT Pub. Date: Jul. 5, 2018

(65) Prior Publication Data
US 2019/0075159 A1 Mar. 7, 2019

(51) Int. Cl.
*H04L 29/08* (2006.01)
*H04L 29/06* (2006.01)
*G06F 13/14* (2006.01)

(52) U.S. Cl.
CPC .......... *H04L 67/1008* (2013.01); *G06F 13/14* (2013.01); *H04L 67/101* (2013.01); *H04L 67/42* (2013.01)

(58) Field of Classification Search
CPC ............... H04L 67/1008; H04L 67/101; H04L 67/1097; H04L 67/125; H04L 67/42;
(Continued)

(56) References Cited

U.S. PATENT DOCUMENTS 6,483,813 B1 * 11/2002 Blencowe ........... G06F 11/3419
370/252
6,542,468 B1 4/2003 Hatakeyama
(Continued)

FOREIGN PATENT DOCUMENTS

JP   11-168505 A   6/1999
JP   2000-194650 A   7/2000
(Continued)

OTHER PUBLICATIONS

International Search Report for WO 2018/123051 A1, dated Mar. 21, 2017.

*Primary Examiner* — Ruolei Zong
(74) *Attorney, Agent, or Firm* — Volpe and Koenig, P.C.

(57) ABSTRACT

An information processing system and method capable of enhancing a processing speed of the entire system includes a first server apparatus that executes a command issued from a client or transfers the command to a second server apparatus which executes the command. The first server apparatus: collects, as server-related information from each second server apparatus, each of processing time and a data communication traffic volume which are retained by the second server apparatus with respect to each combination of a type of the command executed in the past and a path at that time, load information of the second server apparatus, and communication performance of each; predicts processing time of each combination on the basis of the collected server-related; and determines a path for executing the command in consideration of properties of the command issued from the client on the basis of the prediction result.

10 Claims, 15 Drawing Sheets

(58) Field of Classification Search
CPC .. H04L 43/08; G06F 11/3058; G06F 11/3065; G06F 11/3452; G06F 13/14
USPC ........................................................ 709/202
See application file for complete search history.

(56) References Cited

U.S. PATENT DOCUMENTS

| | | | |
|---|---|---|---|
| 6,782,398 B1* | 8/2004 | Bahl | .................. H04L 67/1095 |
| 2003/0177290 A1 | 9/2003 | Kyukawa et al. | |
| 2003/0210701 A1* | 11/2003 | Saiki | .................... H04L 41/042 |
| | | | 370/401 |
| 2005/0076162 A1 | 4/2005 | Tamura et al. | |
| 2009/0059810 A1* | 3/2009 | Kawai | .................... B60T 8/885 |
| | | | 370/252 |
| 2009/0187776 A1* | 7/2009 | Baba | .................... G06F 1/3203 |
| | | | 713/320 |
| 2014/0173117 A1* | 6/2014 | Takatsu | ............... H04L 67/1002 |
| | | | 709/226 |
| 2017/0041182 A1* | 2/2017 | Hanko | .................. H04L 41/046 |
| 2018/0278496 A1* | 9/2018 | Kulshreshtha | .......... H04L 43/04 |

FOREIGN PATENT DOCUMENTS

| | | |
|---|---|---|
| JP | 2003-273951 A | 9/2003 |
| JP | 2005-115600 A | 4/2005 |

\* cited by examiner

Agent Path Table

| Agent Path ID | Storage ID | Communication Mode |
|---|---|---|
| Storage#1-1 | Storage#1 | Lan_Connection#1 |
| Storage#1-2 | Storage#1 | FC_Connection#1 |
| ... | ... | ... |

Apparatus Processing Time Table

| Command | Agent Path ID | Apparatus Processing Time[msec] | | | |
|---|---|---|---|---|---|
| | | History1 | History2 | ... | Average |
| Get Ldev | Storage#1-1 | 110 | ... | ... | 100 |
| Get Ldev | Storage#1-2 | 100 | ... | ... | 90 |
| Create Ldev | Storage#1-1 | 2900 | ... | ... | ... |
| ... | ... | ... | ... | ... | ... |

Communication Traffic Volume Table

| Command | Storage ID | Communication Data Volume[KByte] | | | |
|---|---|---|---|---|---|
| | | History1 | History2 | ... | Average |
| Get Ldev | Storage#1 | 500 | ... | ... | 500 |
| Get Ldev | Storage#2 | 100 | ... | ... | 100 |
| Create Ldev | Storage#1 | 10 | ... | ... | ... |
| ... | ... | ... | ... | ... | ... |

Queue Management Table

| Queue ID | Command | Predicted Processing Completion Time [msec] |
|---|---|---|
| 1 | Get Ldev | 30 |
| 2 | Get host-groups | 50 |
| ... | ... | ... |

Server Load Table

| Number of Simultaneously Executable Queues | Number of Retaining Queues | Predicted Entire Queue Processing Completion Time [msec] | Processing Start Time [msec] | Server Load |
|---|---|---|---|---|
| 10 | 8 | 30 | 0 | 0.8 |
| 41A | 41B | 41C | 41D | 41E |

Path Management Table

| Path ID | Storage ID | Agent ID | Communication Mode |
|---|---|---|---|
| Storage#1-1 | Storage#1 | — | Lan_Connection#1 |
| Storage#1-Agent#1-1 | Storage#1 | Agent#1 | FC_Connection#1 |
| Storage#1-Agent#1-2 | Storage#1 | Agent#1 | Lan_Connection#1 |
| ... | ... | ... | ... |

Apparatus Processing Time Table

| Command | Path ID | Apparatus Processing Time[msec] | | | |
|---|---|---|---|---|---|
| | | History1 | History2 | ... | Average |
| Get Ldev | Storage#1-1 | 110 | ... | ... | 100 |
| Get Ldev | Storage#1-Agent#1-1 | 100 | ... | ... | 90 |
| Create Ldev | Storage#1-Agent#1-2 | 2900 | ... | ... | ... |
| ... | ... | ... | ... | ... | ... |

Command Information Table

| Client Command | Internal Processing Command1 | Internal Processing Command2 | Internal Processing Command3 | ... |
|---|---|---|---|---|
| Get Ldev | Get Ldev | — | — | ... |
| Get CopyPair | Get P-VOL-instance | Get S-VOL-instance | GetCopyPairInfo | ... |
| ... | ... | ... | ... | ... |

Server Load Table

| Path ID | Agent ID | Number of Simultaneously Executable Queues | Number of Retaining Queues | Predicted Entire Queue Processing Completion Time | Server Load |
|---|---|---|---|---|---|
| Storage#1-1 | - | 30 | 8 | 300 | 0.8 |
| Storage#1-Agent#1-1 | Agent#1 | 30 | 20 | 6000 | 0.4 |
| ... | ... | ... | ... | ... | ... |

Predicted Processing Time Table

| Command | Path ID | Predicted Processing Time [msec] |
|---|---|---|
| Get Ldev | Storage#1-1 | 30 |
| Get Ldev | Storage#1-Agent#1-1 | 20 |
| Get Ldev | Storage#1-Agent#1-2 | 35 |
| ... | ... | ... |

25A 25B 25C

25

INFORMATION PROCESSING SYSTEM AND METHOD

TECHNICAL FIELD

The present invention relates to an information processing system and is suited for use in, for example, an information processing system having a manager-agent configuration.

BACKGROUND ART

Conventionally, there has been a manager-agent configuration as one of methods for dispersing commands from a client to a plurality of server apparatuses. With a system having the manager-agent configuration, a command from the client is received by a server apparatus equipped with a manager (hereinafter referred to as the "management server"); actual execution of the command is performed by a server apparatus equipped with an agent (hereinafter referred to as the "agent server"); and the result returned from the agent server is transmitted from the management server to the client.

Regarding an information processing system having such a manager-agent configuration, there has been conventionally a widely used method of enhancing response performance by causing the agent server to select a communication path to a command execution target apparatus (hereinafter referred to as the "storage apparatus") on the basis of, for example, a communication speed of the path (PTL 1 and PTL 2).

CITATION LIST

Patent Literature

PTL 1: Japanese Patent Application Laid-Open Publication No. 2003-273951
PTL 2: Japanese Patent Application Laid-Open Publication No. 2000-194650

SUMMARY OF INVENTION

Technical Problem

Meanwhile, processing time of a management command to the storage apparatus varies depending on types (Out of Band or In Band) of execution framework. This is not only because many of Out-of-Band frameworks are composed of, for example, LANs (Local Area Networks) and many of In-Band frameworks are composed of paths such as FC (Fibre Channel) paths whose communication speeds are faster than those of the Out-of-Band frameworks, but also because the processing content at the storage apparatus varies depending on the types of the execution framework and, as a result, the processing time of commands at the storage apparatus varies depending on the types of the execution framework.

Accordingly, regarding response time of the entire system (the processing time of the storage apparatus+communication time within the system), there is a problem of difficulty in selecting a path of a faster response speed by only considering communication speeds of paths to the storage apparatus.

Practically, some of such management commands show no difference in response performance, while some of them show considerable differences depending on the execution frameworks. Particularly, commands of provisioning or pair operation which internally combine a plurality of commands tend to easily show the differences in the response performance depending on the execution frameworks.

Moreover, many of the management commands for the storage apparatus require several minutes of execution time, so that when selecting a path by a conventional method, there are problems of: the occurrence of queue clogging caused by concentration of commands which require a long time for execution at an agent server, and the occurrence of prolonged occupation of the relevant path due to execution of a synchronization command at a slow path.

Furthermore, since an operation authority is set with respect to the management of the storage apparatus, it is expected that management commands from an administrator are prioritized over commands from general users; however, such consideration is not paid by the conventional method and there has been a possibility that the management commands from the administrator might be buried in the commands from the general users, thereby degrading the response performance.

The present invention has been devised in consideration of the above-described circumstances and aims at proposing an information processing system and method capable of solving the above-described problems at once and enhancing a processing speed of the entire system.

Solution to Problem

In order to solve the above-described problems, according to the present invention, an information processing system includes a first server apparatus and one or more second server apparatuses, wherein the information processing system has the first server apparatus that executes a command issued from a client to the first server apparatus or transfers the command from the first server apparatus to the second server apparatus and the second server apparatus that executes the command, wherein each second server apparatus retains, with respect to each combination of a type of a command executed in the past and a path used for the execution of the command, processing time required for processing of the command by the second server apparatus itself and a data communication traffic volume at the time of execution of the command; and wherein the first server apparatus includes: an information collection unit that collects, as server-related information from each second server apparatus, each of the processing time and the data communication traffic volume which are retained by the second server apparatus with respect to each combination of the type of the command and the path, load information indicative of a load status of the second server apparatus, and communication performance of each path connected to the second server apparatus; a path processing time prediction unit that predicts processing time of each combination of the type of the command and the path on the basis of the server-related information of each second server apparatus which is collected by the information collection unit; a path determination unit that determines a path for executing the command in consideration of properties of the command issued from the client on the basis of a result of the prediction by the path processing time prediction unit; and an execution unit that executes the command issued from the client or causes the relevant second server apparatus to execute the command on the basis of a result of the determination by the path determination unit.

Furthermore, according to the present invention, an information processing method executed by an information processing system including a first server apparatus and one or more second server apparatuses, wherein the information processing system has the first server apparatus that executes a command issued from a client to the first server apparatus or transfers the command from the first server apparatus to the second server apparatus and has the second server apparatus that executes the command, wherein each second server apparatus retains, with respect to each combination of a type of a command executed in the past and a path used for the execution of the command, processing time required for processing of the command by the second server apparatus itself and a data communication traffic volume at the time of execution of the command; and the information processing method includes: a first step executed by the first server apparatus collecting, as server-related information from each second server apparatus, each of the processing time and the data communication traffic volume which are retained by the second server apparatus with respect to each combination of the type of the command and the path, load information indicative of a load status of the second server apparatus, and communication performance of each path connected to the second server apparatus; a second step executed by the first server apparatus predicting processing time of each combination of the type of the command and the path on the basis of the collected server-related information of each second server apparatus; a third step executed by the first server apparatus determining a path for executing the command in consideration of properties of the command issued from the client on the basis of a result of the prediction; and a fourth step executed by the first server apparatus executing the command issued from the client or causing the relevant second server apparatus to execute the command on the basis of a result of the determination.

The information processing system and method according to the present invention can enhance the response speed of the system and properly perform load distribution within the system.

Advantageous Effects of the Invention

The information processing system and method capable of enhancing the processing speed of the entire system can be implemented according to the present invention.

BRIEF DESCRIPTION OF DRAWINGS

FIG. 5 is a conceptual diagram illustrating a structure example of an apparatus processing time table managed by the agent;

FIG. 6 is a conceptual diagram illustrating a structure example of a communication traffic volume table managed by the agent;

FIG. 7 is a conceptual diagram illustrating a structure example of a queue management table managed by the agent;

FIG. 8 is a conceptual diagram illustrating a structure example of a server load table managed by the agent;

FIG. 9 is a conceptual diagram illustrating a structure example of a path management table managed by a manager;

FIG. 10 is a conceptual diagram illustrating a structure example of an apparatus processing time table managed by the manager;

FIG. 13 is a conceptual diagram illustrating a structure example of a command information table managed by the manager;

FIG. 14 is a conceptual diagram illustrating a structure example of a server load table managed by the manager;

FIG. 15 is a conceptual diagram illustrating a structure example of a predicted processing time table managed by the manager;

DESCRIPTION OF EMBODIMENTS

An embodiment of the present invention will be described below in detail with reference to the drawings.

(1) Configuration of Information Processing System According to This Embodiment

Figure 1:
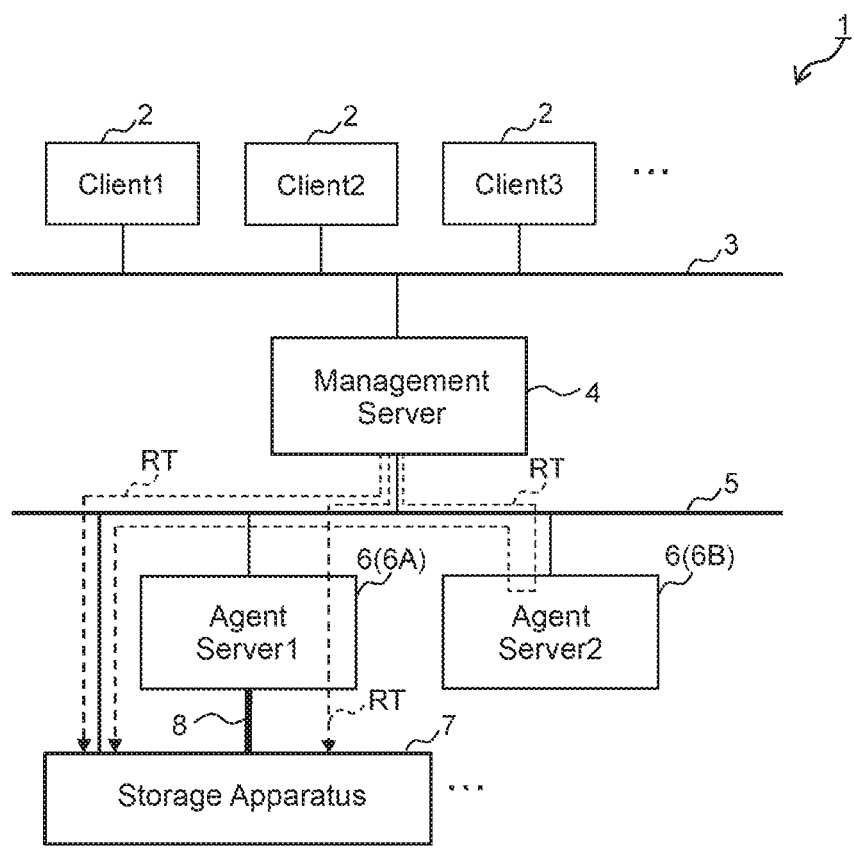
FIG. 1 is a block diagram illustrating a configuration example of an information processing system according to this embodiment.

Referring to FIG. 1, 1 generally represents an information processing system according to this embodiment that has a manager-agent configuration. With this information processing system 1, one or more clients 2 are connected to a management server 4 via a first network 3 such as a LAN (Local Area Network).

Furthermore, the management server 4 is connected to first and second agent servers 6A, 6B and one or more storage apparatuses 7 via a second network 5 which is formed of an Out-of-Band framework that is similarly composed of, for example, a LAN. Furthermore, the first agent server 6A is connected to the storage apparatus 7 via a channel 8 which is formed of an In-Band framework in accordance with a higher-speed communication standard (hereinafter the Fibre Channel [FC] standard shall be used) than that for the first and second networks 3, 5. Incidentally, when it is particularly unnecessary to distinguish between the first and second agent servers 6A, 6B in the following explanation, these agent servers will be hereinafter collectively referred to as the agent server 6.

The client 2 is a computer device provided on a user's side of this information processing system 1 (the user includes an administrator of the information processing system 1). The client 2 transmits various kinds of commands, such as commands for executing I/O processing on the storage apparatus 7 and management commands on the storage apparatus 7, to the management server 4 via the first network 3 in accordance with, for example, the user's operation.

Figure 2:
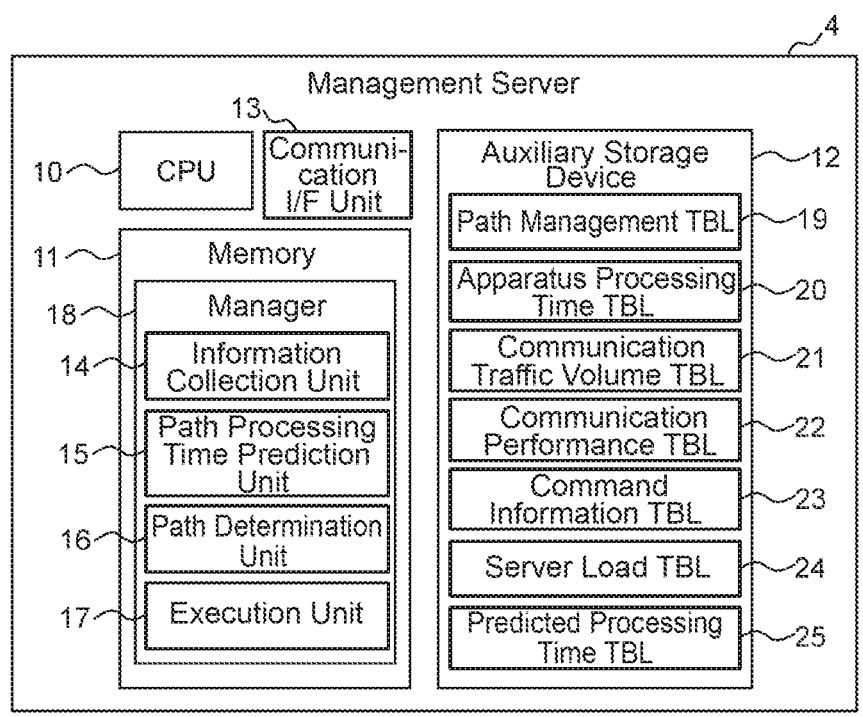
FIG. 2 is a block diagram illustrating a configuration example of a management server.

The management server 4 is a server apparatus that has a function executing a command from the client 2 by itself or transferring that command to the agent server 6 via the second network 5 and having the agent server 6 execute the command; and the management server 4 is configured by including information processing resources such as a CPU (Central Processing Unit) 10, a memory 11, an auxiliary storage device 12, and a communication interface unit 13 as illustrated in FIG. 2.

The CPU 10 is a processor that controls the operations of the entire management server 4. Moreover, the memory 11 is composed of, for example, a volatile semiconductor memory and is used as a work memory of the CPU 10. A manager (program) 18 which is composed of an information collection unit 14, a path processing time prediction unit 15, a path determination unit 16, and an execution unit 17 is stored and retained in this memory 11. The details of the information collection unit 14, the path processing time prediction unit 15, the path determination unit 16, and the execution unit 17 will be described later.

The auxiliary storage device 12 is composed of, for example, large-capacity nonvolatile storage devices such as hard disk drives or SSDs (Solid State Drives) and are used to retain various kinds of programs and necessary information for a long period of time. As the programs stored in the auxiliary storage device 12 are read to the memory 11 and the programs which have been read to the memory 11 are executed by the CPU 10, various kinds of processing is executed by the management server 4 as a whole. A path management table 19, an apparatus processing time table 20, a communication traffic volume table 21, a communication performance table 22, a command information table 23, a server load table 24, and a predicted processing time table 25 which will be described later are retained in this auxiliary storage device 12.

The communication interface unit 13 is composed of, for example, an NIC (Network Interface Card). The communication interface unit 13 performs protocol control upon communication with the client 2 via the first network 3 and upon communication with the first or second agent server 6A, 6B or the storage apparatus 7 via the second network 5.

Figures 3, 4:
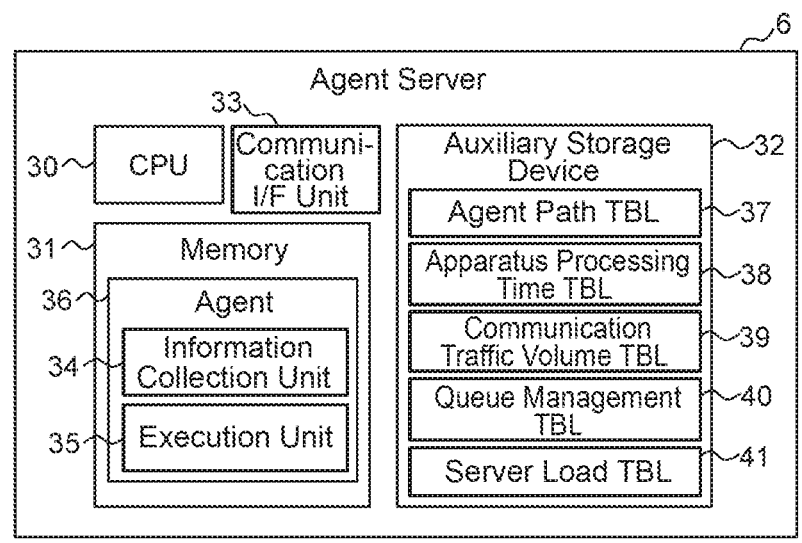
FIG. 3 is a block diagram illustrating a configuration example of an agent server.
FIG. 4 is a conceptual diagram illustrating a structure example of an agent path table managed by an agent.

The agent server 6 is a server apparatus that executes a command from the client 2, which has been transferred from the management server 4 via the second network 5. The agent server 6 is configured by including a CPU 30, a memory 31, an auxiliary storage device 32, and a communication interface unit 33 as illustrated in FIG. 3. Since the CPU 30, the memory 31, the auxiliary storage device 32, and the communication interface unit 33 have similar configurations and functions to those of the corresponding parts of the management server 4 (the CPU 10, the memory 11, the auxiliary storage device 12, and the communication interface unit 13), any detailed explanation about them is omitted here.

With the agent server 6, an agent (program) 36 which is composed of an information collection unit 34 and an execution unit 35 is stored and retained in the memory 31. The details of the information collection unit 34 and the execution unit 35 will be described later. Furthermore, an agent path table 37, an apparatus processing time table 38, a communication traffic volume table 39, a queue management table 40, and a server load table 41 which will be described later are stored and retained in the auxiliary storage device 32.

The manager-agent configuration is constructed by the manager (program) 18 (FIG. 2) mounted in the management server 4 and the agent (program) 36 mounted in the agent server 6, thereby implementing load distribution for the processing on the command from the client 2.

The storage apparatus 7 is composed of, for example, a disk array device equipped with a plurality of hard disk drives and SSDs and provides the client 2 with logical devices which are storage areas for reading/writing data. The storage apparatus 7 executes various kinds of processing such as reading/writing of required data, creation of logical devices, and setting of copy pairs in accordance with various kinds of commands issued from the manager 18 (FIG. 2) for the management server 4 or the agent 36 (FIG. 3) for the agent server 6 according to commands from the client 2.

(2) Path Selection Function According to this Embodiment

Next, a path selection function according to this embodiment that is loaded in the management server 4 will be explained. In a case of this embodiment, the management server 4 is equipped with a path selection function that selects an optimum path RT which achieves both the response performance and the load distribution as the path RT for executing a command issued from the client 2 on the basis of the properties of the command issued from the client 2, the actual result of execution of the command in the past, and the load status of each server apparatus (the management server 4 and each agent server 6).

Incidentally, the term "properties of the command" herein used indicates, for example, the content of a command actually executed by the management server 4 or the agent server 6 according to the command from the client 2 (hereinafter referred to as the "internal processing command"), an attribute of the user (an administrator or a general user) who uses the client 2 which issued the relevant command, and whether the relevant command is a command of the type that should be executed immediately (hereinafter referred to as the "synchronization command") or a command other than the above-mentioned type (hereinafter referred to as the "asynchronization command").

Practically, in a case of this information processing system 1, each agent server 6 stores, regarding each command executed in the past, processing time required for its own server to execute that command (hereinafter referred to as the "apparatus processing time") and a data communication traffic volume at the time of execution of that command separately with respect to each path RT.

Then, the management server 4 collects, for example, the apparatus processing time and the data communication traffic volume with respect to each path RT and the load status of the agent server 6 at that time as the server-related information of the relevant agent server 6 from each agent server 6 and selects a path RT for executing the command based on the collected server-related information and the properties of the command issued from the client 2 at that time.

When this happens, the management server 4 selects the path for executing the command by prioritizing a response speed regarding a command issued from the client 2 used by the administrator of this information processing system 1 so that the execution of the command issued from the client 2 used by the administrator of this information processing system 1 should be prioritized over any command issued from the client 2 used by a general user.

Furthermore, since the synchronization command occupies a path RT, the response performance is more important for the synchronization command than for the asynchronization command. Therefore, regarding the synchronization command, the management server 4 selects a path RT of as good response performance as possible as a path RT for executing the command; and regarding the asynchronization command, the management server 4 selects a path RT for executing the command so that the load will be distributed between the management server 4 and each agent server 6 as much as possible.

As the means for implement the above-described path selection function according to this embodiment, the agent (program) 36 configured by including the information collection unit 34 and the execution unit 35 is stored in the memory 31 for each agent server 6 and the agent path table 37, the apparatus processing time table 38, the communication traffic volume table 39, the queue management table 40, and the server load table 41 are stored in the auxiliary storage device 32 for each agent server 6 as illustrated in FIG. 3.

The information collection unit 34 is a module having a function that collects various kinds of necessary information about its own agent server 6 and creates or updates the agent path table 37, the apparatus processing time table 38, the communication traffic volume table 39, the queue management table 40, and the server load table 41 on the basis of the collected information.

Furthermore, the execution unit 35 is a module having a function that executes a command from the client 2, which has been transferred from the manager 18 (FIG. 2) for the management server 4. The execution unit 35 executes the relevant command by using a path RT for that command, which is reported by the manager 18 together with the command from the client 2 as described later and is determined by the manager 18.

The agent path table 37 is a table used to manage the storage apparatuses 7 managed by the agent 36 mounted in the relevant agent server 6 and paths RT to the storage apparatuses 7. This agent path table 37 is created or updated by the agent 36 when a new storage apparatus 7 or a new communication path to the storage apparatus 7 is additionally registered by the user.

The agent path table 37 has one or more records (rows) as illustrated in FIG. 4 and each one of these records is associated with one path RT. Furthermore, each of these records is divided into an agent path ID column 37A, a storage ID column 37B, and a communication mode column 37C.

Then, the storage ID column 37B stores an identifier (storage ID) of a storage apparatus 7 managed by the relevant agent 36; and the agent path ID column 37A stores an identifier (agent path ID) assigned to the relevant path RT from among paths from the agent server 6 to the storage apparatus 7. Furthermore, the communication mode column 37C stores a communication mode (a communication standard such as LAN or FC) for the relevant path RT.

Therefore, the example of FIG. 4 shows that: the relevant agent 36 manages at least a storage apparatus 7 to which the storage ID "Storage#1" is assigned; at least two paths RT to which the agent path IDs "Storage#1-1" and "Storage#1-2" are assigned, respectively, as paths RT from the agent server 6, in which the agent 36 is mounted, to the storage apparatus 7; and the communication mode of the path RT "Storage#1-1" is "Lan_Connection#1" and the communication mode of the path RT "Storage#1-2" is "FC_Connection#1."

Furthermore, the apparatus processing time table 38 is a table used, with respect to each combination of a command from the client 2 and a path RT capable of executing that command, to manage the aforementioned apparatus processing time required by the relevant agent server 6 to execute the relevant command by using the relevant path RT in the past. This apparatus processing time table 38 is created or updated by the information collection unit 34 (FIG. 3) for the agent 36 when the relevant agent server 6 executes the command from the client 2.

The apparatus processing time table 38 has one or more records (rows) as illustrated in FIG. 5 and each one of these records is associated with one combination of a command and a path RT. Furthermore, each of these records is divided into a command column 38A, an agent path ID column 38B, and an apparatus processing time column 38C.

Then, the command column 38A stores the type of a command from the client 2, which was transferred from the manager 18 (FIG. 2) to the relevant agent 36 in the past; and the agent path ID column 38B stores the agent path ID of a path RT used to execute that command.

Furthermore, the apparatus processing time column 38C is divided into a plurality of (for example, five) history columns 38CA and an average column 38CB. Then, each history column 38CA stores the recent one of the aforementioned apparatus processing time when the relevant command was executed by using the relevant path RT. Specifically speaking, the apparatus processing time when the relevant command was executed last time by using the relevant path RT is stored in the history column 38CA called "History 1"; and the apparatus processing time when the relevant command was executed before then is stored sequentially, starting with newest apparatus processing time, in each of the history columns 38CA adjacent to the right side of the history column 38CA called "History 1." Therefore, the apparatus processing time table 38 retains the apparatus processing times for the same number of times of execution as the number of the recent history columns 38CA with respect to each combination of the command and the path RT. Furthermore, the average column 38CB stores an average value of the respective apparatus processing times for each combination of the relevant command and the relevant path RT stored in the apparatus processing time table 38.

Therefore, the example of FIG. 5 shows that when the relevant agent 36 executed a command "Get Ldev" for collecting information of each logical device in the storage apparatus 7 in the past by accessing the storage apparatus 7 via a path called "Storage#1-1," the apparatus processing time was "110" [msec] and so on and the average value was "100" [msec].

The communication traffic volume table 39 is a table used to manage the data communication traffic volume when the relevant agent 36 executed commands from the client 2 in the past. The communication traffic volume table 39 has one or more records (rows) and each one of these records is associated with one command executed in the past as illustrated in FIG. 6. Furthermore, each of these records is divided into a command column 39A, a storage ID column 39B, and a communication data volume column 39C.

Then, the command column 39A stores the type of a command from the client 2, which was transferred from the manager 18 (FIG. 2) in the past; and the storage ID column 39B stores the storage ID of a storage apparatus 7 which was the target of that command.

Furthermore, the communication data volume column 39C is divided into a plurality of (for example, five) history columns 39CA and an average column 39CB. Then, each history column 39CA stores the recent one of the communication data volumes when the relevant command was executed on the relevant storage apparatus 7. Specifically speaking, the communication data volume when the relevant command was executed last time on the relevant storage apparatus 7 is stored in the history column 39CA called "History 1"; and the communication data volume when the relevant command was executed before then is stored sequentially, by storing a newer communication data volume, in each of the history columns 39CA adjacent to the right side of the history column 39CA called "History 1." Therefore, the communication traffic volume table 39 retains the communication data volumes for the same number of times of execution as the number of the recent history columns 39CA with respect to each combination of the command and the storage apparatus 7. Furthermore, the average column 39CB stores an average value of the respective communication data volumes for each combination of the relevant command and the relevant storage apparatus 7 stored in the apparatus processing time table 38.

Therefore, the example of FIG. 6 shows that when the relevant agent 36 executed the command called "Get Ldev" on the storage apparatus 7 called "Storage#1" in the past, the data communication traffic volume was "500" [Kbyte] and so on and the average value was "500" [Kbyte].

The queue management table 40 is a table used to manage queues provided in the relevant agent server 6 and is configured by including a queue ID column 40A, a command column 40B, and a predicted processing completion time column 40C as illustrated in FIG. 7.

Then, the queue ID 40A column stores an identifier (queue ID) assigned to each queue provided in the agent server 6; and the command column 40B stores the type of a command which is then stored in the relevant queue.

Furthermore, the predicted processing completion time column 40C stores predicted time from the start of processing on the relevant command until its completion (hereinafter referred to as the "predicted processing completion time"). Incidentally, this predicted processing completion time is calculated as an average value of values respectively stored in the average column 38CB (FIG. 5) of the apparatus processing time column 38C (FIG. 5) for individual records (rows) corresponding to the relevant command in the apparatus processing time table 38 (FIG. 5).

Therefore, the example of FIG. 7 shows that the command called "Get Ldev" is stored in a queue with the queue ID "1" in the relevant agent server 6 and the predicted processing completion time is "30" [msec].

Incidentally, each piece of information of this queue management table 40 is registered by the information collection unit 34 for the agent 36 (FIG. 2) every time a command from the client 2 is stored in a queue; and the relevant piece of information of this queue management table 40 is deleted by the information collection unit 34 every time the command stored in the queue is completed.

The server load table 41 is a table used to manage the load status of the relevant agent server 6 and is configured by including a number-of-simultaneously-executable-queues column 41A, a number-of-retaining-queues column 41B, a predicted entire queue processing completion time column 41C, a processing start time column 41D, and a server load column 41E as illustrated in FIG. 8.

Then, the number-of-simultaneously-executable-queues column 41A stores the number of queues that can be executed simultaneously by the relevant agent server 6 from among queues for retaining each of commands from clients 2 provided in the relevant agent server 6. The above-described number of queues will be hereinafter referred to as the number of simultaneously executable queues.

Furthermore, the number-of-retaining-queues column 41B stores the number of queues which currently retain the commands from the client 2 in the relevant agent server 6 (hereinafter referred to as the "number of retaining queues").

Furthermore, the predicted entire queue processing completion time column 41C stores predicted time required to complete all the commands retained in the respective retaining queues (hereinafter referred to as the "predicted entire queue processing completion time"). In the case of this embodiment, this predicted entire queue processing completion time is calculated as a total sum value of the predicted processing completion times for the respective commands retained in the respective retaining queues.

Furthermore, the processing start time column 41D stores time it takes to start processing according to a new command when the new command is currently issued (hereinafter referred to as the "processing start time"). This processing start time is a value calculated according to the following formula.

[Math. 1]

$$\text{Predicted Processing Start Time} = \left(\frac{\text{Total Execution Time}}{\text{The Number of Retaining Queues}}\right) \times \left(\frac{\text{The Number of Retaining Queues}}{\text{The Number of Simultaneously Executable Queues}}\right) \quad (1)$$

Incidentally, regarding Formula (1), the value of (Total Execution Time/The Number of Retaining Queues) should include the number of decimal places to be used for the calculation; and the value of (The Number of Retaining Queues/The Number of Simultaneously Executable Queues) should be a dividable quotient to be used for the calculation and any remainder should be ignored. For example, when the total execution time is 80 [msec], the number of retaining queues is 35, and the number of simultaneously executable queues is 10, the processing start time is calculated as indicated in the following formula.

[Math. 2]

$$\text{Predicted Processing Start Time} = \left(\frac{80}{35}\right) \times \left(\frac{35}{10}\right) = 2.29 \times 3 = 6.86 \quad (2)$$

Furthermore, the server load column 41E stores a value calculated according to the following formula (hereinafter referred to as the "server load") as a numerical value representing the load status of the relevant agent server 6.

[Math. 3]

$$\text{Server Load} = \left(\frac{\text{The Number of Retaining Queues}}{\text{The Number of Simultaneously Executable Queues}}\right) \quad (3)$$

Meanwhile, the manager (program) 18 which is configured by including the information collection unit 14, the path processing time prediction unit 15, the path determination unit 16, and the execution unit 17 is stored, as the means for implementing the aforementioned path selection function according to this embodiment, in the memory 11 for the management server 4 as illustrated in FIG. 2; and the auxiliary storage device 12 for the management server 4 stores the path management table 19, the apparatus processing time table 20, the communication traffic volume table 21, the communication performance table 22, the command information table 23, the server load table 24, and the predicted processing time table 25.

The information collection unit 14 is a module having a function that collects each piece of the aforementioned information retained by the relevant server 6 from each agent server 6 within the system and stores the collected information and necessary information calculated based on the collected information in the apparatus processing time table 20, the communication traffic volume table 21, the communication performance table 22, the server load table 24, and the predicted processing time table 25, respectively.

Furthermore, the path processing time prediction unit 15 is a module having a function that predicts the processing time for each path RT capable of executing a command when executing the command from the client 2 on the basis of the information collected from the information collection unit 14.

Furthermore, the path determination unit 16 is a module having a function that determines a path RT for executing a command received from the client 2 at that time on the basis of the prediction result by the path processing time prediction unit 15 and the properties of that command.

Furthermore, the execution unit 17 is a module having a function that has its own server (the management server 4) execute the relevant command or has the relevant agent server 6 execute the relevant command on the basis of the determination result by the path determination unit 16.

Meanwhile, the path management table 19 is a table used to manage each storage apparatus 7, which the manager 18 (FIG. 2) can access directly or through any one of the agents 36, and a path RT to that storage apparatus 7. This path management table 19 is created or updated by the manager 18 when a new storage apparatus 7 or a new path RT to the storage apparatus 7 is additionally registered by the user.

The path management table 19 stores has one or more records (rows) and one of these records is associated with one path RT as illustrated in FIG. 9. Furthermore, each of these records is divided into a path ID column 19A, a storage ID column 19B, an agent ID column 19C, and a communication mode column 19D.

Then, the storage ID column 19B stores a storage ID of a storage apparatus 7 managed by the manager 18 (FIG. 2); and the path ID column 19A stores an identifier (path ID) assigned to the relevant path RT from among paths RT from the management server 4 to the relevant storage apparatus 7.

Furthermore, when the relevant path RT passes through any one of the agents 36 (FIG. 3), the agent ID column 19C stores an identifier (agent ID) of that agent 36. Furthermore, the communication mode column 19D stores a communication mode for the relevant path RT.

Therefore, the example of FIG. 9 shows that: a storage apparatus 7 to which the storage ID "Storage#1" is assigned exists as a storage apparatus 7 which can be accessed by the manager 18; there are at least a path RT with the path ID "Storage#1-1" which is directly accessed by the manager 18 as a path to the storage apparatus 7, and two paths RT called "Storage#1-Agent#1-1" and "Storage#1-Agent#1-2" which pass through an agent 36 with the agent ID "Agent#1"; and the communication mode of both the paths RT "Storage#1-1" and "Storage#1-Agent#1-2" is "Lan_Connection#1" and the communication mode of the path RT "Storage#1-Agent#1-1" is "FC_Connection#1."

Furthermore, the apparatus processing time table 20 is a table used to manage the apparatus processing time with respect to each combination of the type of a command from the client 2 and a path RT capable of executing that command when the manager 18 (FIG. 2) or the agent 36 (FIG. 3) executed the relevant command by using the relevant path RT in the past.

Regarding a command executed by the manager 18, the information collection unit 14 (FIG. 2) for that manager 18 registers necessary information in the apparatus processing time table 20. Furthermore, regarding a command executed by the agent 36, the information collection unit 14 for the manager 18 acquires information from the aforementioned the apparatus processing time table 38 (FIG. 5) managed by that agent 36 and registers the information in the apparatus processing time table 20 after the execution of the command is completed.

This apparatus processing time table 20 has one or more records (rows) and each one of these records is associated with one combination of a command and a path RT as illustrated in FIG. 10. Furthermore, each of these records is divided into a command column 20A, an agent path ID column 20B, and an apparatus processing time column 20C. Furthermore, the apparatus processing time column 20C is divided into a plurality of history columns 20CA and an average column 20CB.

Then, the command column 20A and the agent path ID column 20B as well as each history column 20CA and the average column 20CB of the apparatus processing time column 20C respectively store similar pieces of information to those stored in the corresponding columns of the apparatus processing time table 38 (the command column 38A, the agent path ID column 38B, the history columns 38CA, or the average column 38CB) which is managed by each agent 36 and described earlier with reference to FIG. 5.

The communication traffic volume table 21 is a table used to manage the data communication traffic volume when the manager 18 or the agent 36 executed a command from the client 2 in the past. Regarding a command executed by the manager 18, the information collection unit 14 for the manager 18 registers necessary information in the communication traffic volume table 21. Furthermore, regarding a command executed by the agent 36, the information collection unit 14 for the manager 18 regularly accesses each agent 36, acquires information from the communication traffic volume table 39 which is managed by the agent 36 and described earlier with reference to FIG. 6, and registers the information in the communication traffic volume table 21.

Figure 11:
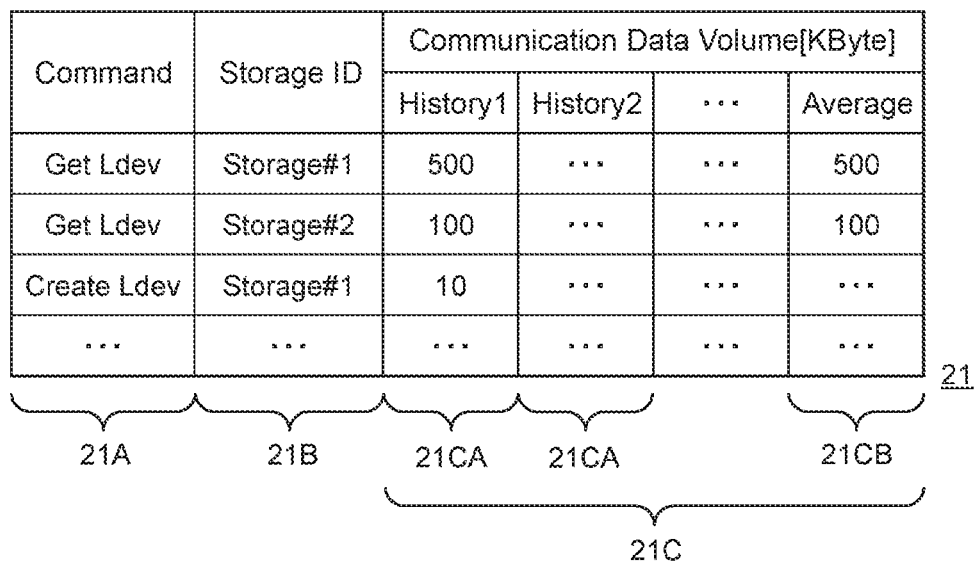
FIG. 11 is a conceptual diagram illustrating a structure example of a communication traffic volume table managed by the manager.

This communication traffic volume table 21 has one or more records (rows) and each one of these records is associated with one command executed in the past as illustrated in FIG. 11. Furthermore, each of these records is divided into a command column 21A, a storage ID column 21B, and a communication data volume column 21C. Furthermore, the communication data volume column 21C is divided into a plurality of history columns 21CA and an average column 21CB.

Then, the command column 21A and the storage ID column 21B as well as each history column 21CA and the average column 21CB of the communication data volume column 21C of the communication traffic volume table 21 respectively store similar pieces of information to those stored in the corresponding columns of the communication traffic volume table 39 (the command column 39A, the storage ID column 39B, the history columns 39CA, or the average column 39CB) which is described earlier with reference to FIG. 6.

The communication performance table 22 is a table used to manage the communication performance of each path RT connected to each storage apparatus 7 managed by the manager 18. The information collection unit 14 (FIG. 2) for the manager 18: issues an instruction to each agent 36 that data of a certain data volume should be regularly acquired from a storage apparatus 7, which is connected to the relevant path RT, via each path RT connected to the agent server 6 in which the relevant agent 36 is mounted; and causes the relevant agent 36 to report the path RT used to acquire the data and time required to acquire the data. Then, the information collection unit 14 acquires a value obtained by dividing the required time by the data volume of that data as the communication performance of the relevant path RT on the basis of the reported required time for each path RT and registers and manages the acquired communication performance of each path RT in the communication performance table 22.

Figure 12:
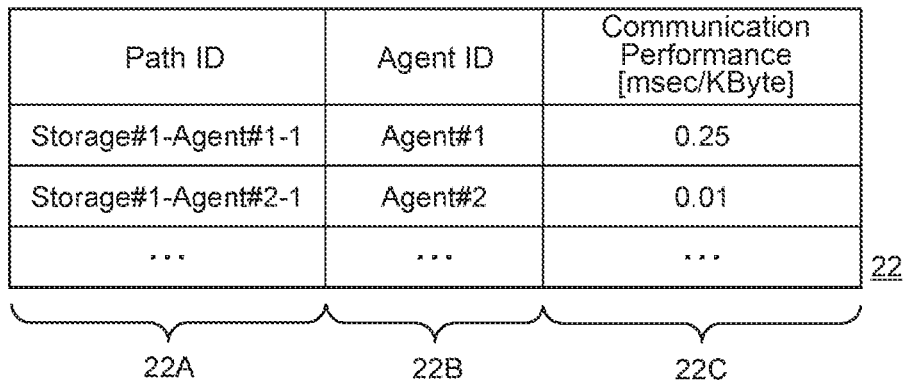
FIG. 12 is a conceptual diagram illustrating a structure example of a communication performance table managed by the manager.

This communication performance table 22 has one or more records (rows) and each one of these records is associated with one path RT as illustrated in FIG. 12. Furthermore, each of these records is divided into a path ID column 22A, an agent ID column 22B, and a communication performance column 22C.

Then, the path ID column 22A stores a path ID of the relevant path RT; and the agent ID column 22B stores an agent ID of the agent 36 which is mounted in the agent server 6 connected to the relevant path RT. Furthermore, the communication performance column 22C stores the most recent communication performance which is calculated as described above.

Therefore, the example of FIG. 12 shows that the communication performance of a path RT with the path ID "Storage#1-Agent#1-1" connected to the agent server 6 in which an agent 36 with the agent ID "Agent#1" is mounted is "0.25" [msec/KByte]; and the communication performance of a path RT with the path ID "Storage#1-Agent#2-1" connected to the same agent server 6 is "0.01" [msec/KByte].

The command information table 23 is a table used, when the management server 4 or the agent server 6 which has received a command from the client 2 executes that command, to manage an internal processing command which is issued to the target storage apparatus 7 according to the content of the relevant command. This command information table 23 is created in advance by, for example, the user.

The command information table 23 has one or more records (rows) and each one of these records is associated with one command as illustrated in FIG. 13. Furthermore, each of these records is divided into a client command column 23A and a plurality of internal processing command columns 23B.

Then, the client command column 23A stores the type of a command issued from the client 2; and the internal processing command columns 23B store all internal processing commands actually issued by the management server 4 (the manager 18) or the agent server 6 (the agent 36), which executes the relevant command, to the target storage apparatus 7 by sequentially storing the commands in the necessary number of internal processing command columns 23B, starting from the internal processing command column 23B called "Internal Processing Command 1."

Therefore, the example of FIG. 13 shows that when the management server 4 (the manager 18) or the agent server 6 (the agent 36) executes a command called "Get CopyPair" which has been issued from the client 2 and is to command that information of each copy pair defined within the target storage apparatus 7 should be acquired, the management server 4 (the manager 18) or the agent server 6 (the agent 36) sequentially transmits an internal processing command called "Get P-VOL-instance" to transmit information of a logical device, which is a copy source of each copy pair, to the storage apparatus 7, an internal processing command called "Get S-VOL-instance" to transmit information of a logical device, which is a copy destination of each copy pair, and an internal processing command called "GetCopyPairInfo" to transmit the entire information of each copy pair.

The server load table 24 is a table used to manage the load status of the management server 4 and the agent server 6. Regarding information about the management server 4, the information collection unit 14 (FIG. 2) for the manager 18 registers the information in the server load table 24. Furthermore, regarding information about the agent server 6, the information collection unit 14 for the manager 18 regularly accesses each agent 36, acquires the information from the aforementioned server load table 41 (FIG. 8) managed by the relevant agent 36, and registers the information in the server load table 24.

This server load table 24 has one or more records (rows) and one row is associated with one path RT as illustrated in FIG. 14. Furthermore, each of these records is divided into a path ID column 24A, an agent ID column 24B, a number-of-simultaneously-executable-queues column 24C, a number-of-retaining-queues column 24D, a predicted entire queue processing completion time column 24E, and a server load column 24F.

Then, the path ID column 24A stores the path ID of the relevant path RT. Furthermore, when the server connected to the relevant path RT is the agent server 6, the agent ID column 24B stores the agent ID of the agent 36 mounted in that agent server 6; and when the server connected to the relevant path RT is the management server 4, the agent ID column 24B stores nothing.

Furthermore, the number-of-simultaneously-executable-queues column 24C stores the number of queues which can be simultaneously executed by the management server 4 or the agent server 6 connected to the relevant path RT (the number of simultaneously executable queues); and the number-of-retaining-queues column 24D stores the number of all queues provided in the management server 4 or the agent server 6 (the number of retaining queues).

Furthermore, the predicted entire queue processing completion time column 24E stores predicted time required by the management server 4 or the agent server 6 connected to the relevant path RT to complete a command stored in each retaining queue (predicted entire queue processing completion time). When the server connected to the relevant path RT is the management server 4, this predicted entire queue processing completion time which is calculated by the information collection unit 14 for the manager 18 as described earlier is stored; and when the server connected to the relevant path RT is the agent server 6, the predicted entire queue processing completion time which is acquired from that agent server 6 is stored.

Furthermore, the server load column 24F stores a value representing the load status (server load) of the relevant server (the management server 4 or the agent server 6). When the server connected to the relevant path RT is the management server 4, this server load which is calculated by the information collection unit 14 for the manager 18 by using the aforementioned Formula (3) is stored; and when the server connected to the relevant path RT is the agent server 6, the server load which is acquired from the agent server 6 is stored.

Therefore, the example of FIG. 14 shows that the number of simultaneously executable queues of the agent server 6 in which, for example, the agent 36 with the agent ID "Agent#1" connected to the path RT with the path ID "Storage#1-Agent#1-1" is mounted, is "30," the number of retaining queues is "20," the predicted entire queue processing completion time is "6000" [msec], and the server load of the server (the management server 4 or the agent server 6) connected to that path RT is "0.4."

The predicted processing time table 25 is a table used to manage a predicted value of time required for processing with respect to each combination of a command from the client 2 and a path RT used when processing that command (predicted processing time). The information collection unit 14 for the manager 18 mounted in the management server 4 calculates, with respect to each combination of the command and the path, for example, the processing time of the processing executed for that combination in the past and an average value of processing time of dummy processing which is regularly executed, as the predicted processing time for the relevant combination of the command and the path RT and registers and manages the calculated predicted processing time in this predicted processing time table 25.

This predicted processing time table 25 has one or more records (rows) and one record is associated with one combination of the command and the path RT as illustrated in FIG. 15. Furthermore, each record is divided into a command column 25A, a path ID column 25B, and a predicted processing time column 25C.

Then, the command column 25A stores the type of a command issued from the client 2; and the path ID column 25B stores a path ID of a path RT which can be used when executing that command. Furthermore, the predicted processing time column 25C stores predicted processing time when executing the relevant command by using the relevant path RT. Incidentally, a method for calculating this predicted processing time will be explained with reference to FIG. 16.

Therefore, the example of FIG. 15 shows that: there are at least three paths RT with the path IDs "Storage#1-1," "Storage#1-Agent#1-1," and "Storage#1-Agent#1-2" as paths RT for executing a command called "Get Ldev"; and the predicted processing times for these paths RT are "30" [msec], "20" [msec], and "35" [msec], respectively.

(3) Various Kinds of Processing Regarding Path Selection Function According to this Embodiment Next, specific content of various kinds of processing regarding the path selection function according to this embodiment will be explained. Incidentally, the following explanation will be given by referring to a processing subject of the various kinds of processing as a "module"; however, needless to say, the CPU 10 for the management server 4 practically executes the processing on the basis of the relevant module.

(3-1) Predicted Processing Time Calculation Processing

Figure 16:
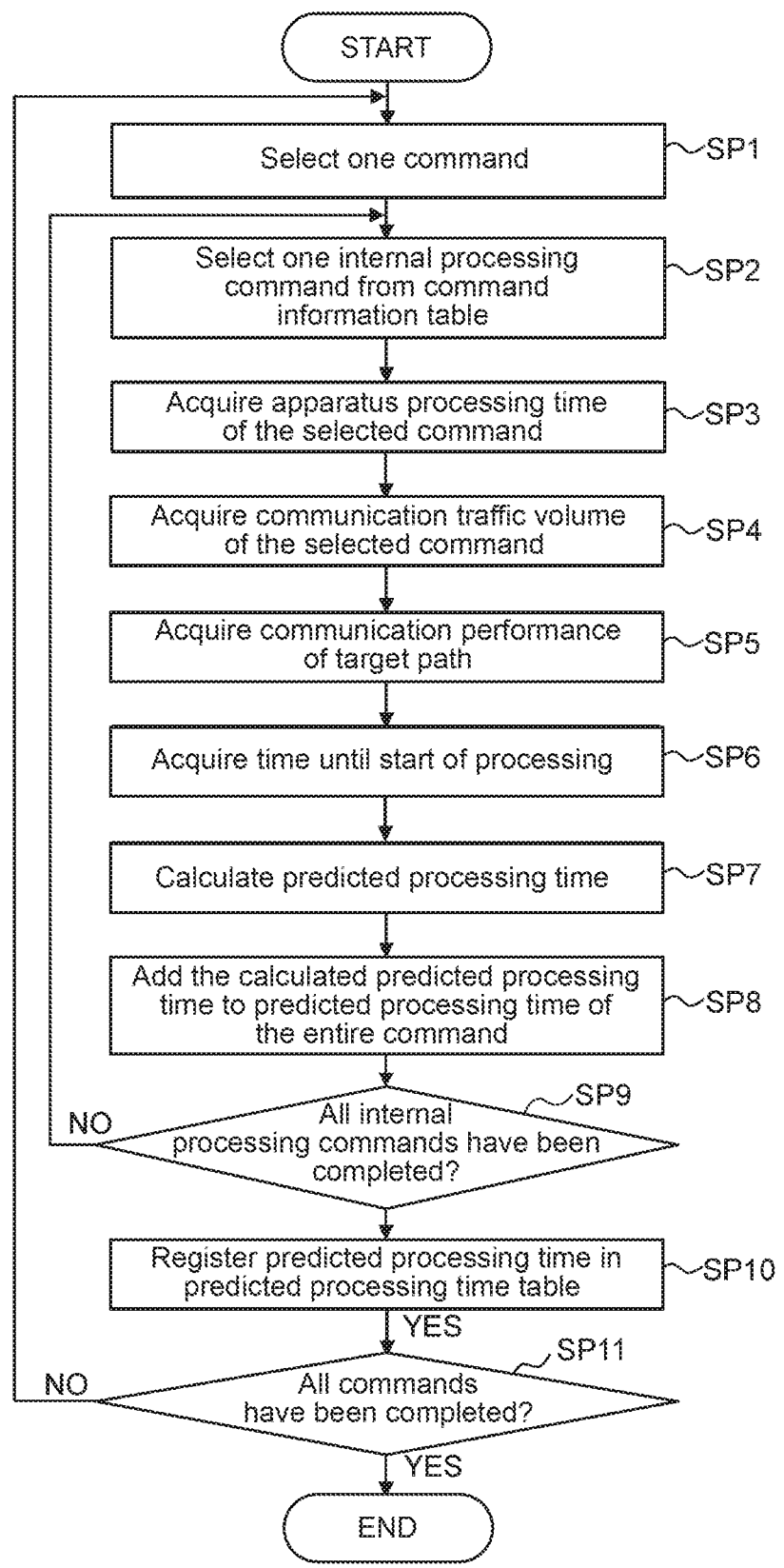
FIG. 16 is a flowchart illustrating a processing sequence for predicted processing time calculation processing.

FIG. 16 illustrates a processing sequence for predicted processing time calculation processing which is regularly executed by the path processing time prediction unit 15 (FIG. 2) for the manager 18 (FIG. 2). The path processing time prediction unit 15 calculates the predicted processing time, which is described above with reference to FIG. 15, with respect to each combination of a command issued from the client 2 and a path RT in accordance with the processing sequence illustrated in this FIG. 16 (predicted time required to complete the processing of the relevant command).

Practically, after staring this predicted processing time calculation processing, the path processing time prediction unit 15 firstly selects one command from among commands registered in the command information table 23 (FIG. 13) (SP1) and selects one internal processing command from among internal processing commands to be executed for the command selected in SP1 (hereinafter referred to as the "selected command") by referring to the command information table 23 (FIG. 13) (SP2).

Subsequently, the path processing time prediction unit 15 acquires the apparatus processing time for each path RT capable of executing the selected command from the apparatus processing time table 20 (FIG. 10) (SP3). Furthermore, the path processing time prediction unit 15 acquires the average value of the communication traffic volume for each path RT capable of executing the selected command from the average column 21CB (FIG. 11) of the relevant record of the communication traffic volume table 21 (FIG. 11) (SP4). Furthermore, the path processing time prediction unit 15 acquires the communication performance of each path RT capable of executing the selected command from the communication performance table 22 (FIG. 12) (SP5).

Next, the path processing time prediction unit 15 acquires, for each combination of the selected command and the path RT capable of executing the selected command, time required by the management server 4 or the agent server 6 connected to the relevant path RT to be able to start the processing on the selected command (processing start time) from the server load table 24 (FIG. 14) (SP6).

Subsequently, the path processing time prediction unit 15 calculates predicted processing time T3 required with respect to each path RT capable of executing the selected command to execute the internal processing command selected in step SP2 according to the following formula, where T1 represents the apparatus processing time acquired in step SP3, CT represents the communication traffic volume acquired in step SP4, CP represents the communication performance acquired in step SP5, and T2 represents the processing start time acquired in step SP6 (SP7).

[Math. 4]

$$T3=T1+CT \times CP+T2 \quad (4)$$

The path processing time prediction unit 15 (SP7) adds the calculated predicted processing time T3 to a total value (initial value is "0") of the predicted processing time T3 which has been calculated with respect to the selected command until then for each path RT capable of executing the selected command (SP8).

Subsequently, the path processing time prediction unit 15 judges whether or not the execution of the processing from step SP3 to step SP8 has been completed with respect to all the internal processing commands of the selected command, by referring to the command information table 23 (FIG. 13) (SP9). Then, if the path processing time prediction unit 15 obtains a negative result in this judgment, the processing returns to step SP2; and then the path processing time prediction unit 15 repeats the processing from step SP2 to step SP9 by sequentially switching the internal processing command selected in step SP2 to another internal processing command which has not been processed.

Then, when the path processing time prediction unit 15 eventually obtains an affirmative result in step SP9 by completing the execution of the processing from step SP3 to step SP8 with respect to all the internal processing commands of the selected command, it registers (newly registers or updates) the predicted processing time for each path RT obtained in the last step SP8, as the predicted processing time for each combination of the path RT and the selected command, in the predicted processing time table 25 (FIG. 15) (SP10).

Next, the path processing time prediction unit 15 judges whether or not the execution of the processing from step SP2 to step SP10 has been completed with respect to all the commands registered in the command information table 23 (FIG. 13) (SP11). Then, if the path processing time prediction unit 15 obtains a negative result in this judgment, the processing returns to step SP1 and then the path processing time prediction unit 15 repeats the processing from step SP1 to step SP11 by sequentially switching the command selected in step SP1 to another command which has not been selected.

Then, when the path processing time prediction unit 15 eventually obtains an affirmative result in step SP11 by completing the execution of the processing from step SP2 to step SP10 with respect to all the commands registered in the command information table 23, it terminates this predicted processing time calculation processing.

(3-2) Path Determination Processing

Figure 17:
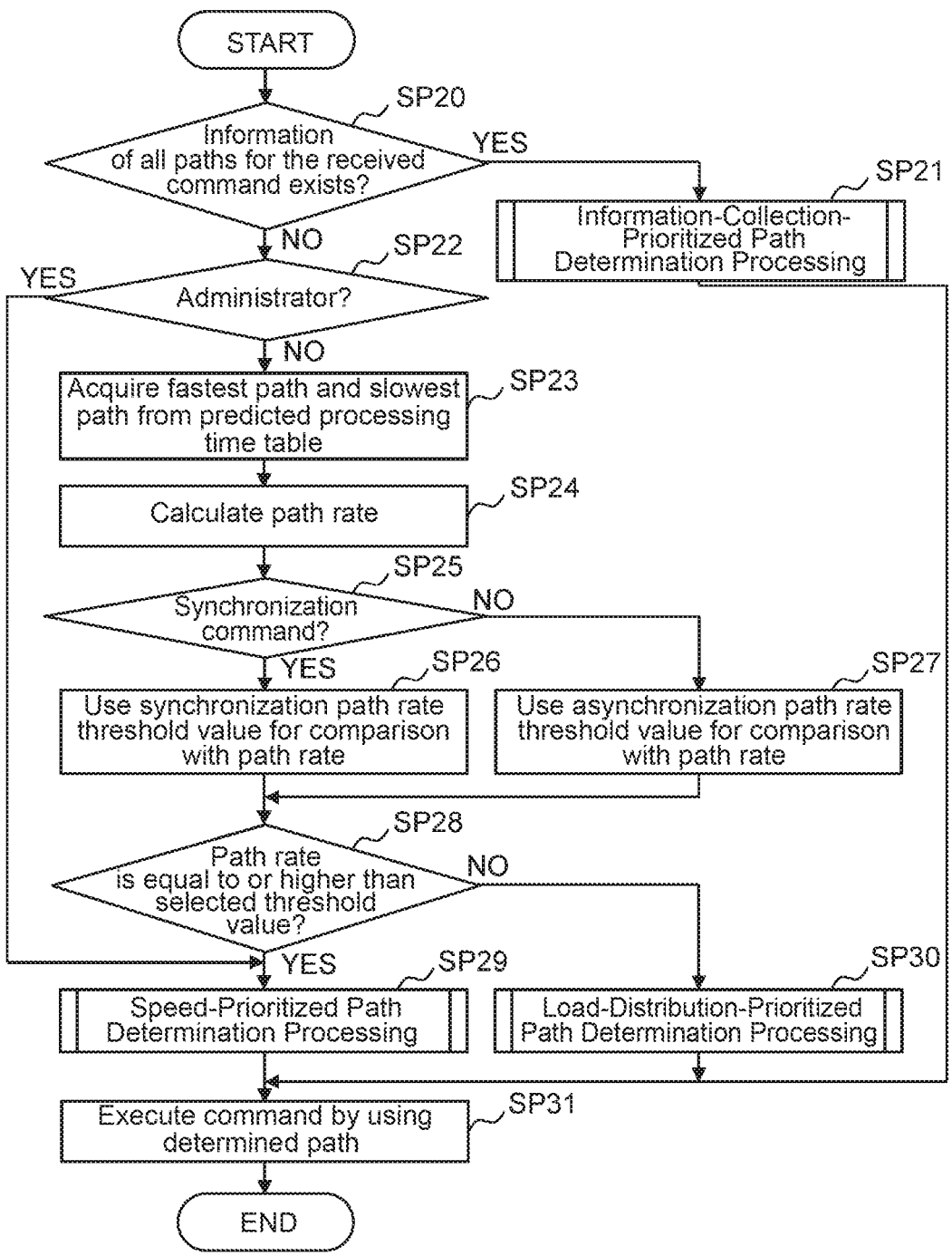
FIG. 17 is a flowchart illustrating a processing sequence for path determination processing.

Meanwhile, FIG. 17 illustrates a processing sequence for the path determination processing executed by the path determination unit 16 (FIG. 2) for the manager 18 (FIG. 2) which is mounted in the management server 4. After receiving a command from the client 2, the path determination unit 16 determines a path RT to be used when executing this command in accordance with the processing sequence illustrated in this FIG. 17.

Practically, after receiving the command from the client 2, the path determination unit 16 starts the path determination processing illustrated in this FIG. 17 and firstly judges whether or not the predicted processing time is registered with respect to all paths RT which can execute that command (hereinafter referred to as the "received command" as appropriate), by referring to the predicted processing time table 25 (FIG. 15) (SP20).

Then, if the path determination unit 16 obtains an affirmative result in this judgment, collection of information about paths RT which can execute the received command and regarding which the predicted processing time has not been registered yet in the predicted processing time table 25 (hereinafter referred to as the "unregistered predicted processing time paths") RT is to be prioritized, so that the path determination unit 16 executes information-collection-prioritized path determination processing for determining a path RT to be used to execute the currently received command from among the unregistered predicted processing time paths RT (SP21); and then the processing proceeds to step SP31.

On the other hand, if the path determination unit 16 obtains a negative result in the judgment of step SP20, it judges whether or not the received command was issued from the client 2 used by the administrator of this information processing system 1 (SP22). Then, if the path determination unit 16 obtains an affirmative result in this judgment, it executes speed-prioritized path determination processing for determining the path RT for the received command by prioritizing the response speed (SP29); and then the processing proceeds to step SP31.

On the other hand, obtaining a negative result in the judgment of step SP22 means that the received command was issued from the client 2 used by a general user who is not the administrator of this information processing system 1. Consequently, the path determination unit 16 then acquires the predicted processing time for a path with the shortest predicted processing time (hereinafter referred to as the "fastest path") and the predicted processing time for a path with the longest predicted processing time (hereinafter referred to as the "slowest path"), from among the paths RT capable of executing the received command, from the predicted processing time table 25 (SP23).

Subsequently, the path determination unit 16 calculates a quotient obtained by dividing the predicted processing time of the slowest path acquired in step SP23 by the predicted processing time of the fastest path as a path rate of the received command (SP24). Incidentally, this path rate represents the degree of influence caused by the selection of the path RT upon the response performance of the system.

Next, the path determination unit 16 judges whether or not the attribute of the received command is, for example, a synchronization command for synchronizing logical devices which are set as a copy pair (SP25). Then, if the path determination unit 16 obtains an affirmative result in this judgment, it selects a threshold value for a preset synchronization command (hereinafter referred to as the "synchronization command threshold value") as a threshold value to be used in step SP28 described later (SP26). Furthermore, if the path determination unit 16 obtains a negative result in the judgment of step SP25, it selects a threshold value for a preset asynchronization command (hereinafter referred to as the "asynchronization command threshold value") as the threshold value to be used in step SP28 (SP27).

Next, the path determination unit 16 judges whether or not the path rate calculated in step SP24 is equal to or more than the threshold value selected in step SP26 or step SP27 (the synchronization command threshold value or the asynchronization command threshold value) (SP28). Then, if the path determination unit 16 obtains an affirmative result in this judgment, it executes speed-prioritized path selection processing for selecting the path RT for the received command by prioritizing the response speed (SP29). Furthermore, if the path determination unit 16 obtains a negative result in the judgment of step SP28, it executes load-distribution-prioritized path selection processing for selecting the path RT for the received command by prioritizing the load distribution (SP30).

Incidentally, since the synchronization command occupies a path RT as mentioned earlier, the response performance is more important for the synchronization command than for the asynchronization command. Therefore, when the command from the client 2 is the synchronization command, the path RT should be selected by prioritizing the response speed as much as possible; and when the command is the asynchronization command, the path RT should be selected by prioritizing the load distribution within the system as much as possible. So, the value of the synchronization command threshold value in step SP26 is set as a lower value than the value of the asynchronization command threshold value in step SP27.

Subsequently, the path determination unit 16 issues an instruction to the execution unit 17 (FIG. 2) for the manager 18 to directly execute the received command, or indirectly execute the received command by using the relevant agent 36, by using the path RT selected in step SP21, step SP29, or step SP30 (SP31). Furthermore, the path determination unit 16 issues a first instruction to the information collection unit 14 for the manager 18 (FIG. 2) to collect necessary information and issues a second instruction to the path processing time prediction unit 15 (FIG. 2) to create or update the predicted processing time table 25 (FIG. 15) (SP31).

Consequently, when the server which has then executed the received command is the management server 4, the information collection unit 14 which has received the first instruction registers the then-acquired apparatus processing time in the apparatus processing time table 20 (FIG. 10); and when the server which has then executed the received command is the agent server 6, the information collection unit 14 acquires the apparatus processing time at that time from the agent server 6 and registers it in the apparatus processing time table 20. Furthermore, the path processing time prediction unit 15 which has received the second instruction newly registers or updates the predicted processing time for the received command in the predicted processing time table 25 (FIG. 15) by executing the processing from step SP2 to step SP9 of the path processing time prediction processing described earlier with reference to FIG. 16.

Then, the path determination unit 16 terminates this path determination processing.

Figure 18:
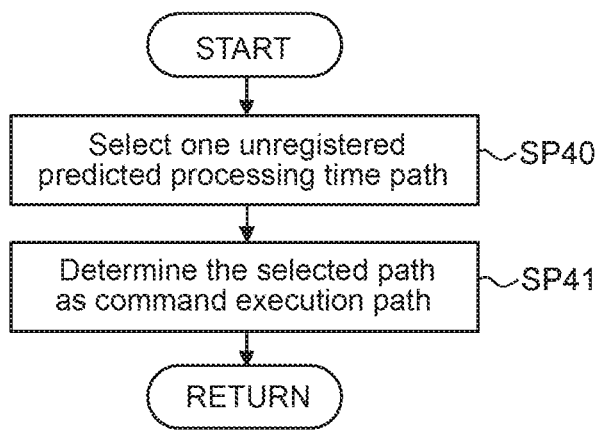
FIG. 18 is a flowchart illustrating a processing sequence for information-collection-prioritized path determination processing.

Incidentally, FIG. 18 illustrates the specific processing content of the information-collection-prioritized path determination processing executed by the path determination unit 16 in step SP21 of the aforementioned path determination processing.

Having proceeded to step SP21 of the path determination processing, the path determination unit 16 starts the information-collection-prioritized path determination processing illustrated in FIG. 18 and selects one unregistered predicted processing time path from among paths regarding which the predicted processing times are not registered in the predicted processing time table 25 (FIG. 15) (the unregistered predicted processing time paths) (SP40). Incidentally, any selection method may be applied to the method for selecting the unregistered predicted processing time path for this selection described above.

Subsequently, the path determination unit 16 determines the unregistered predicted processing time path selected in step SP40 as the path RT for executing the currently received command (SP41); and then, the path determination unit 16 terminates this information-collection-prioritized path determination processing and returns to the path determination processing in FIG. 17.

Figure 19:
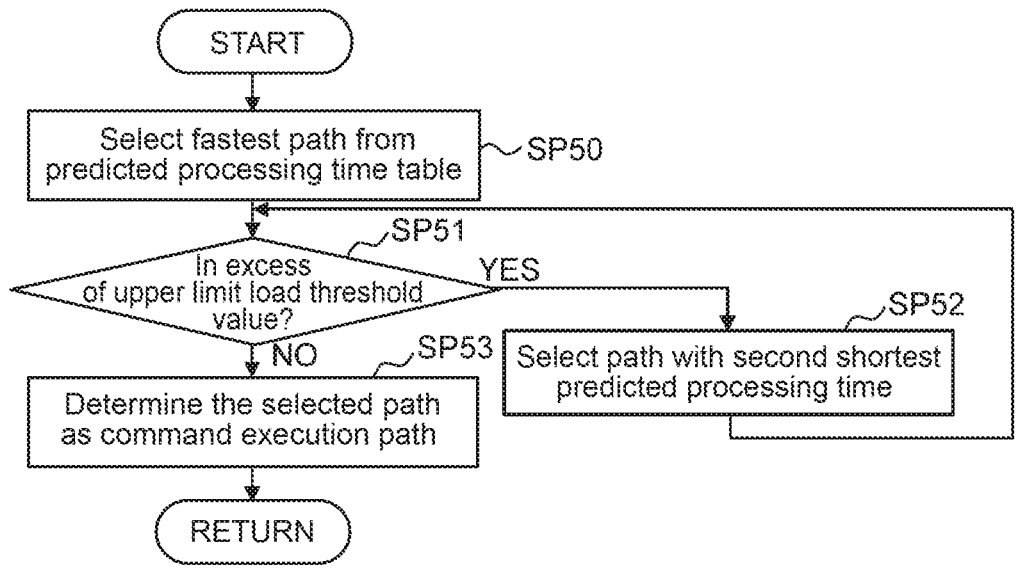
FIG. 19 is a flowchart illustrating a processing sequence for speed-prioritized path determination processing.

On the other hand, FIG. 19 illustrates the specific processing content of the speed-prioritized path determination processing executed by the path determination unit 16 in step SP29 of the path determination processing.

Having proceeded to step SP29 of the path determination processing, the path determination unit 16 starts the speed-prioritized path determination processing illustrated in this FIG. 19 and firstly selects a path RT with the shortest predicted processing time from among paths RT capable of executing the currently received command by referring to the predicted processing time table 25 (SP50).

Subsequently, the path determination unit 16 judges whether the load of the management server 4 or the agent server 6 connected to the path RT selected in step SP50 does not exceed a threshold value which is set in advance to prevent excessive load concentration (hereinafter referred to as the "upper limit load threshold value") (SP51). This judgment is made by acquiring a value stored in the server load column 24F (FIG. 14) of the relevant record for the path RT selected in step SP50 in the server load table 24 (FIG. 14) and judging whether that value does not exceed the upper limit load threshold value.

Then, if the path determination unit 16 obtains a negative result in the judgment of step SP51, it selects a path with the second shortest predicted processing time from among the paths RT capable of executing the currently received command by referring to the predicted processing time table 25 (SP52) and then repeats a loop of step SP51 to step SP52 and then to step SP51 until it obtains an affirmative result in step SP51.

Then, when the path determination unit 16 eventually obtains an affirmative result in step SP51 by selecting a path RT regarding which the load does not exceed the upper limit load threshold value in step SP51 or step SP52, it selects the path RT selected in step SP51 or step SP52 as the path RT for the currently received command (SP53) and then terminates this speed-prioritized path determination processing and returns to the path determination processing in FIG. 17.

Figure 20:
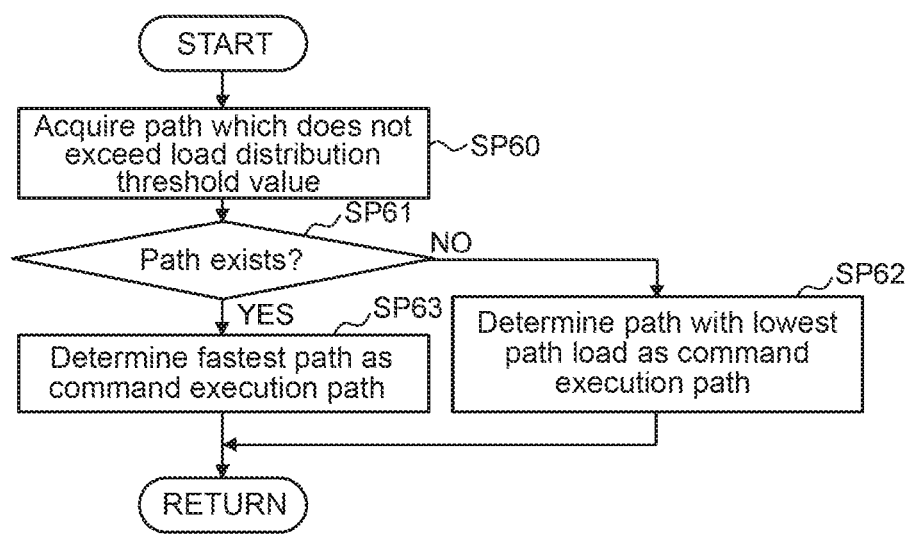
FIG. 20 is a flowchart illustrating a processing sequence for load distribution path determination processing.

On the other hand, FIG. 20 illustrates the specific processing content of the load-distribution-prioritized path determination processing executed by the path determination unit 16 in step SP30 of the path determination processing described earlier with reference to FIG. 17.

Having proceeded to step SP30 of the path determination processing, the path determination unit 16 starts the load-distribution-prioritized path determination processing illustrated in this FIG. 20 and firstly acquires all paths RT which can execute the currently received command and regarding which the server load of the server (the management server 4 or the agent server 6) connected to the relevant path RT does not exceed a present threshold value (hereinafter referred to as the "load distribution threshold value"), by referring to the server load table 24 (FIG. 14) (SP60). Incidentally, the load distribution threshold value is a threshold value targeted for the load distribution and is set as a lower value than the aforementioned upper limit load threshold value used in step SP51 (FIG. 19) of the speed-prioritized path determination processing.

Subsequently, the path determination unit 16 judges whether or not the path RT has been successfully selected in step SP60 (SP61). Then, if the path determination unit 16 obtains a negative result in the judgment of step SP61, it determines a path RT with the lowest server load of the server (the management server 4 or the agent server 6) connected to the relevant path RT, from among the paths RT capable of executing the currently received command, as a command execution path for executing the currently received command (SP62) and then terminates this load-distribution-prioritized path determination processing and returns to the path determination processing in FIG. 17.

On the other hand, if the path determination unit 16 obtains an affirmative result in the judgment of step SP61, it determines a path with the shortest predicted processing time, from among the paths acquired in step SP60, as the command execution path for executing the currently received command by referring to the predicted processing time table 25 (FIG. 15) (SP63) and then terminates this load-distribution-prioritized path determination processing and returns to the path determination processing in FIG. 17.

(4) Advantageous Effects of this Embodiment

With the information processing system 1 according to this embodiment as described above, the management server 4 selects an optimum path RT which achieves both the response performance and the load distribution as a path RT for executing a command issued from the client 2 on the basis of the properties of the command, the actual result of the execution of the command in the past, and the load status of the management server 4 and each agent server 6.

Therefore, when this information processing system 1 is employed, the response speed of the system can be enhanced and the load distribution within the system can be implemented properly. As a result, the processing speed of the entire system can be enhanced.

(5) Other Embodiments

Incidentally, the aforementioned embodiment has been described about the case where the present invention is applied to the information processing system 1 configured as illustrated in FIG. 1; however, the present invention is not limited to this example and can be applied to a wide variety of other systems having the manager-agent configuration.

Furthermore, the aforementioned embodiment has been described about the case where the target of the command from the client 2 is the storage apparatus 7; however, the present invention is not limited to this example and an apparatus other than the storage apparatus 7 may be the command target.

INDUSTRIAL AVAILABILITY

The present invention can be applied to a wide variety of information processing systems having the manager-agent configuration.

REFERENCE SIGNS LIST

1: information processing system
2: client
4: management server
6, 6A, 6B: agent servers
7: storage apparatus
10, 30: CPU
11, 31: memory
12, 32: auxiliary storage device
14, 34: information collection unit
15: path processing time prediction unit
16: path determination unit
17, 35: execution unit
18: manager
19: path management table
20, 38: apparatus processing time table
21, 39: communication traffic volume table
22: communication performance table
23: command information table
24, 41: server load table
25: predicted processing time table
36: agent
37: agent path table
40: queue management table

The invention claimed is:

1. An information processing system comprising a first server apparatus and one or more second server apparatuses, wherein the first server apparatus executes, via a first processor, a command issued from a client to the first server apparatus or transfers, via the first processor, the command from the first server apparatus to a second server apparatus and the second server apparatus executes, via a second processor, the command,
  wherein each second server apparatus, via a second memory, retains, with respect to each combination of a type of a command executed in the past and a path used for transporting the command, processing time required for processing of the command by the second server apparatus itself and a data communication traffic volume at the time of execution of the command; and
  wherein the first server apparatus includes:
    a first memory that stores, as server-related information from each second server apparatus, each of the processing time and the data communication traffic volume which are retained by the second server apparatus with respect to each combination of the type of the command and the path, load information indicative of a load status of the second server apparatus, and communication performance of each path connected to the second server apparatus; and
    the processor which is configured to: predicts processing time of each combination of the type of the command and the path on the basis of the server-related information of each second server apparatus which is collected by the processor,
    determines a path for executing the command in consideration of properties of the command issued from the client on the basis of a result of the predicted processing time and
    execute the command issued from the client or causes the relevant second server apparatus to execute the command on the basis of a result of the determined path.

2. The information processing system according to claim 1, wherein the processor is further configured to
  calculate a degree of influence on response performance caused by selection of the path on the basis of the result of the predicted processing time; and
  when the calculated degree of influence is equal to or more than a preset threshold value, determine the path for executing the command issued from the client by prioritizing a response speed; and
  when the degree of influence is less than the threshold value, determine the path for executing the command by prioritizing load distribution.

3. The information processing system according to claim 2,
  wherein a value of the threshold value when the command from the client is a synchronization command is set as a lower value than a value of the threshold value when the command is an asynchronization command.

4. The information processing system according to claim 1,
  wherein when the processing time of all the paths which can be used is not predicted with respect to the command issued from the client, the processor determines the path for executing the command from among the paths for which the processing time is not predicted.

5. The information processing system according to claim 1,
  wherein the processor determines the path for executing the command from the client in consideration of, as the properties of the command, content of a command actually executed by the first server apparatus or the second server apparatus according to the command from the client, an attribute of a user who uses the client which issued the command, and whether or not the command is of a type that should be executed immediately.

6. An information processing method executed by an information processing system including a first server apparatus and one or more second server apparatuses, the information processing system having the first server apparatus executes, via a first processor, a command issued from a client to the first server apparatus or transferring, via the first processor, the command from the first server apparatus to the second server apparatus and having the second server apparatus execute, via a second processor, the command, wherein each second server apparatus, via a second memory, retains processing time required for processing of the command by the second server apparatus itself and a data communication traffic volume at the time of execution of the command with respect to each combination of a type of the command executed in the past and a path used for transporting the command; and wherein the information processing method comprises:
- a first step executed by the first server apparatus collecting, via the first processor, and storing via a first memory, as server-related information from each second server apparatus, each of the processing time and the data communication traffic volume which are retained by the second server apparatus with respect to each combination of the type of the command and the path, load information indicative of a load status of the second server apparatus, and communication performance of each path connected to the second server apparatus;
- a second step executed by the first server apparatus predicting, via the first processor, processing time of each combination of the type of the command and the path on the basis of the collected server-related information of each second server apparatus;
- a third step executed by the first server apparatus determining, via the first processor, a path for executing the command in consideration of properties of the command issued from the client on the basis of a result of the prediction; and
- a fourth step executed by the first server apparatus executing, via the first processor, the command issued from the client or causing the relevant second server apparatus to execute the command on the basis of a result of the determination.

7. The information processing method according to claim 6, wherein in the third step, the first server apparatus calculates, via the first processor, a degree of influence on response performance caused by selection of the path on the basis of the result of the prediction in the second step; and wherein when the calculated degree of influence is equal to or more than a preset threshold value, the first server apparatus determines, via the first processor, the path for executing the command issued from the client by prioritizing a response speed; and when the degree of influence is less than the threshold value, the first server apparatus determines, via the first processor, the path for executing the command by prioritizing load distribution.

8. The information processing method according to claim 7, wherein when the command from the client is a synchronization command, a value of the threshold value is set as a lower value than a value of the threshold value when the command is an asynchronization command.

9. The information processing method according to claim 6, wherein in the third step, when the processing time of all the paths which can be used is not predicted with respect to the command issued from the client, the first server apparatus determines, via the first processor, the path for executing the command from among the paths for which the processing time is not predicted.

10. The information processing method according to claim 6, wherein in the third step, the first server apparatus determines, via the first processor, the path for executing the command from the client in consideration of, as the properties of the command, content of a command actually executed by the first server apparatus or the second server apparatus according to the command from the client, an attribute of a user who uses the client which issued the command, and whether or not the command is of a type that should be executed immediately.

* * * * *